US011800166B2

(12) United States Patent
Baccour et al.

(10) Patent No.: US 11,800,166 B2
(45) Date of Patent: Oct. 24, 2023

(54) FORECASTING AND RESERVATION OF TRANSCODING RESOURCES FOR LIVE STREAMING

(71) Applicants: Qatar University, Doha (QA); Qatar Foundation for Education, Science and Community Development, Doha (QA)

(72) Inventors: Emna Baccour, Doha (QA); Fatima Haouari, Doha (QA); Aiman Erbad, Doha (QA); Amr Mohamed, Doha (QA); Mohsen Guizani, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 17/069,067

(22) Filed: Oct. 13, 2020

(65) Prior Publication Data

US 2021/0112116 A1 Apr. 15, 2021

Related U.S. Application Data

(60) Provisional application No. 62/914,619, filed on Oct. 14, 2019.

(51) Int. Cl.
*H04N 21/262* (2011.01)
*H04L 67/1001* (2022.01)
(Continued)

(52) U.S. Cl.
CPC ....... *H04N 21/26241* (2013.01); *H04L 65/61* (2022.05); *H04L 67/1001* (2022.05);
(Continued)

(58) Field of Classification Search
CPC ............ H04N 21/23439; H04N 21/24; H04N 21/2181; H04N 21/231–23116;
(Continued)

(56) References Cited

U.S. PATENT DOCUMENTS 5,930,473 A 7/1999 Teng et al.
9,537,973 B2 1/2017 Batrouni et al.
(Continued)

FOREIGN PATENT DOCUMENTS

WO 2018039060 A1 3/2018

OTHER PUBLICATIONS

Vilutis et al., Model of load balancing and scheduling in cloud computing, 2012, IEEE, Proceedings of the ITI 2012 34th International Conference on Information Technology Interfaces, pp. 1-6. (Year: 2012).*

(Continued)

*Primary Examiner* — Gregory Todd
(74) *Attorney, Agent, or Firm* — K&L Gates LLP

(57) ABSTRACT

The present disclosure provides a system and methods for determining and reserving an optimized amount of required cloud instance resources in order to provide quality streaming to viewers while also reducing overhead costs. For content providers, the choice of appropriate cloud location to transcode the live streams and appropriate number of video representations to serve the current viewership is a key in minimizing cost. However, this task cannot typically be done on the fly due to the properties of live streaming characterized by its dynamic, heterogeneity and wideness. The provided system helps predict the incoming load and the exact number of resources to allocate at each cloud site to help prevent the content provider from over-provisioning resources, leading to an extra cost, or under-provisioning resources, leading to viewers' dissatisfaction.

17 Claims, 4 Drawing Sheets

(51) Int. Cl.
*H04L 65/61* (2022.01)
*H04N 21/231* (2011.01)
*H04N 21/24* (2011.01)
*H04N 21/25* (2011.01)

(52) U.S. Cl.
CPC ..... *H04N 21/231* (2013.01); *H04N 21/23103* (2013.01); *H04N 21/23113* (2013.01); *H04N 21/23116* (2013.01); *H04N 21/2407* (2013.01); *H04N 21/2408* (2013.01); *H04N 21/251* (2013.01); *H04N 21/262* (2013.01); *H04N 21/2625* (2013.01)

(58) Field of Classification Search
CPC ........... H04N 21/2407; H04N 21/2408; H04N 21/251; H04N 21/25841; H04N 21/442; H04N 21/2187; H04N 21/2405; H04N 21/26241; H04N 21/23103; H04N 21/23113; H04N 21/262; H04N 21/2625; H04L 67/1002; H04L 67/1031; H04L 65/4069; H04L 65/4076; H04L 65/80; H04L 65/61; H04L 67/1001
See application file for complete search history.

(56) References Cited

U.S. PATENT DOCUMENTS

| | | | |
|---|---|---|---|
| 9,538,220 | B2 | 1/2017 | Elarabawy et al. |
| 9,848,213 | B2* | 12/2017 | Chan ................... H04N 21/232 |
| 10,116,721 | B1* | 10/2018 | LaPier ................ H04L 65/4084 |
| 2012/0137336 | A1* | 5/2012 | Applegate ............ H04N 21/252 725/95 |
| 2016/0286244 | A1 | 9/2016 | Chang et al. |
| 2018/0176657 | A1* | 6/2018 | Dadheech ........ H04N 21/64738 |
| 2018/0184146 | A1* | 6/2018 | Pichon ............... H04N 21/2407 |
| 2019/0034849 | A1 | 1/2019 | Romaine et al. |
| 2019/0098065 | A1* | 3/2019 | LaPier ...................... H04L 1/00 |
| 2019/0208006 | A1* | 7/2019 | Chen ...................... H04L 67/10 |
| 2019/0384981 | A1* | 12/2019 | Swaminathan ...... G06K 9/6256 |
| 2019/0394498 | A1* | 12/2019 | Lo ..................... H04N 21/6408 |
| 2021/0306660 | A1* | 9/2021 | Yamada ............... H04N 19/137 |

OTHER PUBLICATIONS

Wei et al., Decentralized Resource Coordination across Service Workflows in a Cloud Environment, 2013, IEEE, 2013 Workshops on Enabling Technologies: Infrastructure for Collaborative Enterprises, pp. 15-20. (Year: 2013).*

Vega et al.: A Review of Predictive Quality of Experience Management in Video Streaming Services. IEEE Transactions on Broadcasting (Mar. 2018), pp. 1-13. (Year: 2018).*

L. Liu, H. Hu, Y. Luo and Y. Wen, "When Wireless Video Streaming Meets AI: A Deep Learning Approach," Oct. 4, 2019, IEEE Wireless Communications, vol. 27, No. 2, pp. 127-133. (Year: 2019).*

Jokhio et al., Prediction-Based Dynamic Resource Allocation for Video Transcoding in Cloud Computing, 2013 21st Euromicro International Conference on Parallel, Distributed, and Network-Based Processing, IEEE DOI 10.1109/PDP.2013.44, pp. 254-261. (Year: 2013).*

Niu et al., Quality-Assured Cloud Bandwidth Auto-Scaling for Video-on-Demand Applications, 2012 Proceedings IEEE Infocom, 978-1-4673-0775-8/12, pp. 460-468. (Year: 2012).*

* cited by examiner

FORECASTING AND RESERVATION OF TRANSCODING RESOURCES FOR LIVE STREAMING

PRIORITY CLAIM

The present application claims priority to and the benefit of U.S. Provisional Application 62/914,619, filed Oct. 14, 2019, the entirety of which is herein incorporated by reference.

BACKGROUND

Cloud computing and processing has become very prevalent with the public's ever-increasing media consumption. This technology offers flexible and cost-effective computing resources that are especially useful for live applications. As such, certain practices have developed within the cloud computing space, including the rental of cloud instances. For example, geo-distributed cloud live video applications can benefit from on demand resource renting in which these rentals may be made on an hourly basis and may be obtained without an upfront payment or any long-term contractual agreement.

One issue faced by those that make use of these rentals is that live streaming applications have strict video startup delay requirements, including transcoding and streaming delays. Such an issue arises as there exists a delay when a rented cloud instant is activated. For example, a rental cloud instant may require two minutes before it is fully booted and ready to function. Such a delay is undesired during a live streaming event.

To combat these delay problems, an entity may pre-rent or reserve a certain number of cloud instances or transcoding resources in preparation for a streaming event. Rental providers may incentivize this method by providing discounts (e.g., as much as a 75% discount) for reserving these instances ahead of time. Therefore, the entity wishing to rent the rentals may save substantial amounts of money by reserving these cloud instances ahead of time. One challenge to realizing these benefits is that it is difficult to predict the number of cloud instances to pre-rent. For example, an entity may waste capital should it rent too many cloud instance resources. In addition, over-provisioning cloud instance or transcoding resources decreases the amount of total resources available for other tasks while also providing no benefit to users or the renting entity. Therefore, there is little benefit to overprovisioning resources as it costs the renting entity more to hold onto these transcoding resources than to have them go unused.

On the other hand, should the entity not reserve enough cloud instances or transcoding resources, the viewer experience may be diminished because the entity has insufficient bandwidth to transcode all videos to meet a desired stream quality. In such instances, the entity may be forced to rent more resources at the undiscounted rate.

At least some typical systems or methods that attempt to optimize crowdsourced live video resource allocation for geo-distributed clouds in order to maximize quality of experience introduce dynamic programming approaches and online greedy heuristics for transcoding resources scheduling to minimize the cost and maximize the quality of experience. However, these typical systems or methods consider on-demand renting of cloud instances, which is not always adequate for live streaming systems due to the start-up time needed to boot servers. Other typical systems or methods have proposed to prepare resources that are able to handle the peak load scenarios. However, these systems or methods typically lead to over-provisioning, cost waste and energy inefficiency.

Therefore, there exists a need for a system and method that solves at least the above drawbacks.

SUMMARY

The present disclosure provides new and innovative systems and methods for determining an amount of cloud instance resources needed for providing a desired streaming quality level. In an example, a system includes a resource allocation optimizer and a plurality of cloud sites in communication with the resource allocation optimizer. The resource allocation optimizer includes a first processor in communication with a first memory. Each cloud site includes a respective second processor in communication with a respective second memory. The resource allocation's processor is configured to receive collected video information from each of the plurality of cloud sites; determine a desired quantity of cloud instances for each respective cloud site based on the received collected video information; and transmit each determined desired quantity of cloud instances to its respective cloud site. The collected video information includes videos streamed at a first time.

Each respective cloud site processor is configured to predict, using at least one model, a quantity of cloud instances needed to achieve a predetermined quality level for videos streaming at a second time subsequent to the first time, based on the determined desired quantity of cloud instances for the respective cloud site; and reserve a quantity of cloud instances at the respective cloud site based on the prediction.

In an example, a method includes receiving collected video information from each of a plurality of cloud sites. The collected video information includes information on a plurality of videos broadcasted at the plurality of cloud sites. A desired quantity of cloud instances is determined for each respective cloud site based on the received collected video information. Each determined desired quantity of cloud instances is transmitted to its respective cloud site.

In an example, a method includes transmitting collected video information to an external server. The collected video information includes information on one or more videos streamed at a first time. A desired quantity of cloud instances may be received from the external server. The desired quantity of cloud instances is determined based on the collected video information. Using at least one model, a quantity of cloud instances needed to achieve a predetermined quality level for a video streaming at a second time subsequent to the first time is predicted based on the determined desired quantity of cloud instances. A quantity of cloud instances is reserved based on the prediction.

DETAILED DESCRIPTION

Figure 1:
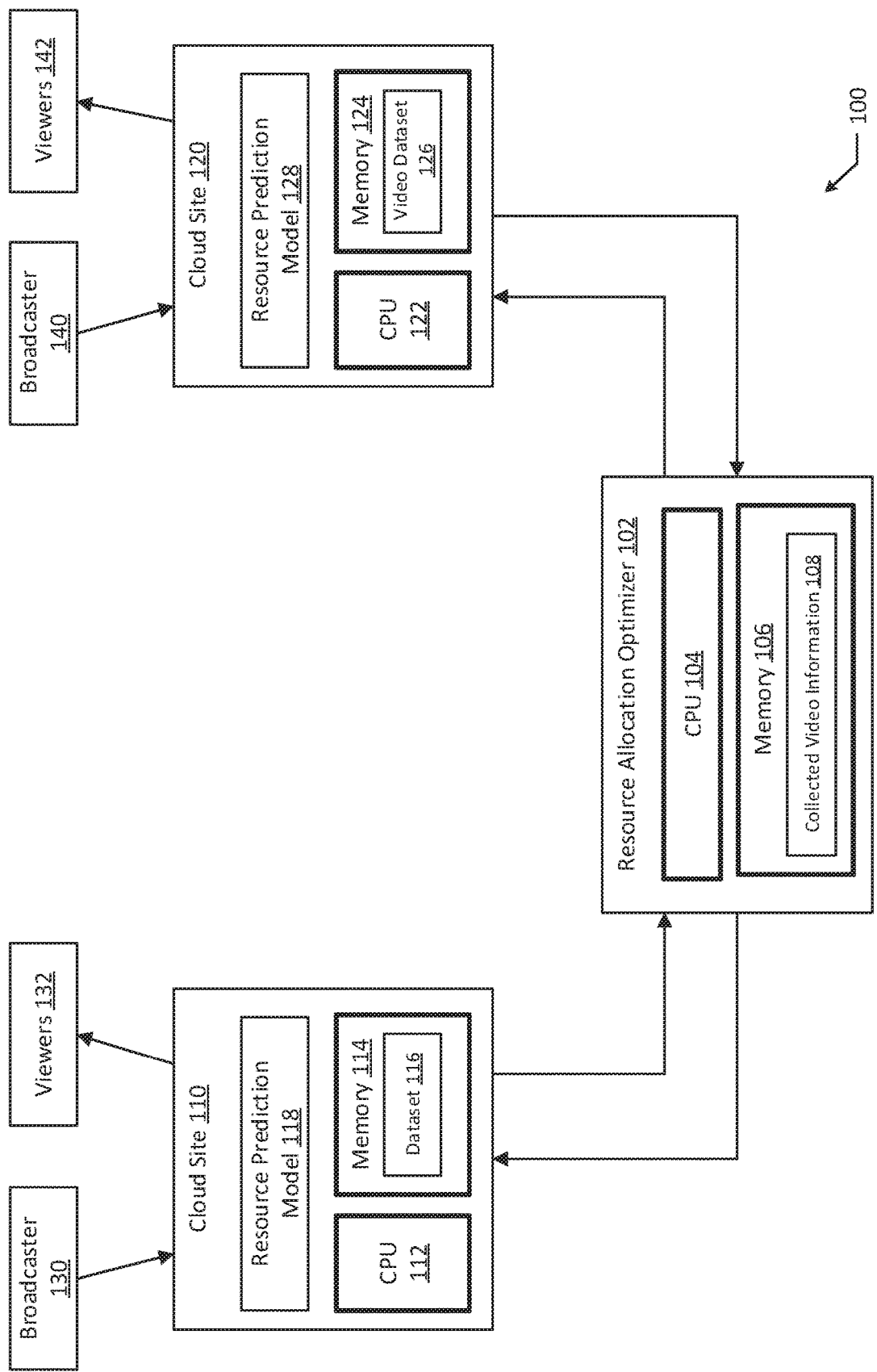
FIG. 1 illustrates a block diagram of an example system for determining cloud instance resources needed to stream content, according to an aspect of the present disclosure.

The present disclosure provides a system and methods for determining and reserving an optimized amount of required cloud instance resources in order to provide quality streaming to viewers while also reducing overhead costs. For content providers, the choice of appropriate cloud location to transcode the live streams and appropriate number of video representations to serve the current viewership is a key in minimizing cost. However, this task cannot typically be done on the fly due to the properties of live streaming characterized by its dynamic, heterogeneity and wideness. The provided system helps predict the incoming load and the exact number of resources to allocate at each cloud site to help prevent the content provider from over-provisioning resources, leading to an extra cost, or under-provisioning resources, leading to viewers' dissatisfaction. A content providers' profit is typically directly proportional to the viewers perceived quality of experience, and therefore, it is important for content providers to deliver viewers' expected quality of experience in a cost effective manner. Viewers who experience low quality of experience may abandon a video playback. The presently disclosed system provides assigning incoming videos to proactively prepared servers at the proximity of viewers, without the need for initialization delay to boot on demand servers, which helps ensure users can watch a live stream without buffering.

The provided system and methods address the problem of start-up delays and extra-cost. An advantage of the provided system is that it predicts the exact resources needed at each cloud location and for each required representation at a minimum cost while respecting delays constraints, based on historical optimal allocations. The cloud servers are pre-rented proactively in such a way the content provider can benefit from the reservation discount and machines are booted beforehand to allow direct assigning of transcoding tasks.

The provided system includes a resource allocation optimizer in communication with multiple cloud sites. The cloud sites may be distributed geographically as part of a geo-distributed cloud infrastructure. In at least some instances, the resource allocation optimizer uses past incoming videos to determine a desired or optimal quantity of transcoding resources, or cloud instances, that may be required at each cloud site during certain past intervals. In some instances, this optimization takes into account the latency and requested video bitrate constraints that may exist. In at least some aspects, each cloud site may include a predictive model for predicting a quantity of cloud instances needed for a future live stream at a respective cloud site. In various aspects, the respective results of the resource allocation optimizer for each cloud site may be transmitted to their respective cloud sites to be used by the predictive models. In various aspects, the results of the resource allocation optimizer may be used to train each of the predictive models regarding optimal resource allocation at each time frame at each cloud site.

The respective predictive models may be deployed to determine the optimal number of transcoding resources that should be reserved for the immediate future (e.g., next hour, next day, next month, etc.) at each cloud site. The respective predictive models, in conjunction with the offline resource allocation optimizer, may function in a live setting or to plan for a future event, in various instances. The resource allocation optimizer may analyze the prior intervals within a live streaming event and determine, based on both the information from these prior intervals and the earlier training based on past videos, the optimal number of cloud instances for these prior intervals at each geo-distributed cloud site. These optimizations may then be passed to the trained predictive model at each cloud site which then, based on the received optimizations and its prior training, determine the amount of transcoding resources to be reserved at that cloud site for the future event. Then, the amount of transcoding resources may be reserved with reduced pricing without the worry of over or under-provisioning.

The presently disclosed system and methods may provide benefits to cloud service providers. For example, by leasing exact resources for the content providers, cloud service providers can manage their servers' infrastructure more efficiently. Additionally, by preparing and offering the appropriate resources to allocate the required number of representations at multiple locations, cloud service providers can avoid congestions caused by accessing one cloud location or serving one video version. Furthermore, preparing resources only in sites where the videos are popular can prevent underutilization caused by allocating videos on inadequate cloud regions with few viewers. Avoiding the underutilization problem helps avoid inefficient energy consumption.

The presently disclosed system and methods may provide benefits to content viewers. For example, by having ready resources to allocate videos on the fly, the streaming initialization delays are minimized. Also, allocating resources at the vicinity of viewers contributes to minimize the access delays and the playback buffering. Additional advantages provided by the presently disclosed system and methods will become apparent from the following description of the figures.

FIG. 1 illustrates a box diagram of an example system 100 for determining cloud instance resources needed to stream content. The system 100 includes a resource allocation optimizer 102. In at least some aspects, the resource allocation optimizer 102 is in communication with multiple cloud sites 110, 120. For example, the resource allocation optimizer 102 may communicate with the multiple cloud sites 110, 120 over a network. The network can include, for example, the Internet or some other data network, including, but not limited to, any suitable wide area network or local area network. In the illustrated example, the system 100 includes the cloud site 110 and the cloud site 120. In other examples, the system 100 may include any suitable quantity of cloud sites 110, 120 (e.g., 3, 5, 8, 15, 50, etc.). Each cloud site 110, 120 may be a data center implemented by cloud hosting—a type of web hosting which uses multiple different servers to balance the load and maximize uptime. For example, instead of using a single server, a web site can tap into a "cluster" that uses resources from a centralized pool. In at least some aspects, the cloud sites 110, 120 are arranged as part of a geo-distributed cloud infrastructure. Stated differently, the cloud sites 110, 120 may be distributed geographically around a country, continent, the world, etc. For example, the cloud site 110 may be located in the United States, whereas the cloud site 120 may be located in Mumbai, India.

In at least some aspects of the system 100, broadcasters broadcast their live streams to viewers via one or more of the cloud sites 110, 120. In some aspects, broadcasters may be allocated to a cloud site 110, 120 geographically nearest to the broadcaster. In an example, a broadcaster 130 may broadcast a live video stream to viewers 132 via the cloud site 110. In another example, a broadcaster 140 may similarly broadcast a live video stream to viewers 142 via the cloud site 120. In various instances, the broadcaster 130 and the broadcaster 140 may broadcast over a network. The network can include, for example, the Internet or some other data network, including, but not limited to, any suitable wide area network or local area network. To efficiently broadcast their respective live video streams, it would be beneficial for the broadcasters 130 and 140 to be able to accurately predict a quantity of cloud instance resources that they will need at their respective cloud sites 110 and 120. Such a prediction would help enable the broadcasters 130 and 140 to reserve a needed quantity of cloud instance resources in advance of their respective live video streams.

The resource allocation optimizer 102 may include a processor in communication with a memory 106. The processor may be a CPU 104, an ASIC, or any other similar device. In other examples, the components of the resource allocation optimizer 102 may be combined, rearranged, removed, or provided on a separate device or server. In various aspects, the memory 106 may store collected video information 108 related to live streamed videos that have been broadcast at the cloud site 110 over a period of time (e.g., days, months, years, etc.). In an example, the collected video information 108 may include any one or more of a length (e.g., minutes), size (e.g., gigabytes), bitrate (e.g., megabytes/sec), frame rate (e.g., frames/sec), resolution (e.g., 1080p), or similar information of a streamed live video and geographical locations of the viewers 132. In various aspects, the resource allocation optimizer 102 may be deployed in a centralized server that is in communication with the cloud site 110 and the cloud site 120. In at least some aspects, the resource allocation optimizer 102 determines an optimized resource allocation for the cloud site 110 for a video that has been live streamed in the past and stored in the memory 106. The resource allocation optimizer 102 may do the same for the cloud site 120. In some aspects, the resource allocation optimizer 102 may determine from which cloud site 110 or 120 that viewers (e.g., the viewers 132 or 142) should be served.

In various aspects, the cloud site 110 may include a processor in communication with a memory 114. The processor may be a CPU 112, an ASIC, or any other similar device. In various aspects, a dataset 116 may be stored in the memory 114. In some aspects, the dataset 116 includes information based on optimized resource allocation determinations from the resource allocation optimizer 102 on live streamed videos that have been broadcast at the cloud site 110. Stated differently, the resource allocation optimizer 102 may make determinations based on the collected video information 108 and information based on those determinations may be stored in the dataset 116. In an example, this information in the dataset 116 may include time series datasets including records of the quantity of cloud instances rented for each time interval in a period of time that has already occurred. In some instances, this information in the dataset 116 may include determinations from the resource allocation optimizer 102 of a quantity of cloud instances that would have been ideal to rent corresponding to how many were actually rented.

In at least some aspects, the cloud site 110 may include a resource prediction model 118 trained to predict a quantity of cloud instances needed to achieve a predetermined quality level for a live stream video that has yet to broadcast at the cloud site 110. This prediction may be based, at least in part, on a determined desired quantity of cloud instances, which is determined by the resource allocation optimizer 102. For example, the resource allocation optimizer 102 may make a series of determinations of what a desired or optimal quantity of cloud instances is for a set of videos that have already been broadcast at the cloud site 110. This determination data may be stored in the dataset 116 and the resource prediction model 118 may be trained based on this determination data. The training helps the resource prediction model 118 to predict a quantity of cloud instances needed to live stream a particular video at the cloud site 110 in the future.

The resource prediction model 118 may be implemented by one or more machine learning models including one or more supervised learning models, unsupervised learning models, or other types of machine learning models. In various aspects, the resource prediction model 118 may be trained by a machine learning algorithm. For example, the machine learning algorithm may be Long Short Term Memory (LSTM), Gated Recurrent Unit (GRU), Convolutional Neural Network (CNN), MultiLayer Perceptron (MLP), or XGboost in various instances. In some aspects, the mean absolute error may be set as a loss function when training the resource prediction model 118. In some examples, the components of the cloud site 110 may be combined, rearranged, removed, or provided on a separate device or server.

In various aspects, the cloud site 120 may include a processor in communication with a memory 124. The processor may be a CPU 122, an ASIC, or any other similar device. In various aspects, a dataset 126 may be stored in the memory 124. The dataset 126 may include information similar to the dataset 116, except that the dataset 126 includes records of the quantity of cloud instances rented for each time interval in a period of time for the cloud site 126.

In at least some aspects, the cloud site 120 may include a resource prediction model 128 trained to predict a quantity of cloud instances needed to achieve a predetermined quality level for a live stream video that has yet to broadcast at the cloud site 120. This prediction may be based, at least in part, on a determined desired quantity of cloud instances, which is determined by the resource allocation optimizer 102. For example, the resource allocation optimizer 102 may make a series of determinations of what a desired or optimal quantity of cloud instances is for a set of videos that have already been broadcast at the cloud site 120. This determination data may be stored in the dataset 126 and the resource prediction model 128 may be trained based on this determination data. The training helps the resource prediction model 128 to predict a quantity of cloud instances needed to live stream a particular video at the cloud site 120 in the future.

The resource prediction model 128 may be implemented by one or more machine learning models including one or more supervised learning models, unsupervised learning models, or other types of machine learning models. In various aspects, the resource prediction model 128 may be trained by a machine learning algorithm. For example, the machine learning algorithm may be Long Short Term Memory (LSTM), Gated Recurrent Unit (GRU), Convolutional Neural Network (CNN), MultiLayer Perceptron (MLP), or XGboost in various instances. In some aspects, the mean absolute error may be set as a loss function when training the resource prediction model 128. In some examples, the components of the cloud site 120 may be combined, rearranged, removed, or provided on a separate device or server.

In various aspects, the resource prediction model 118, 128 of each respective cloud site 110, 120 of the system 100 is trained based on data pertaining to its own respective cloud site 110, 120. For example, the resource prediction model 118 of the cloud site 110 may be trained using the dataset 116, which includes information specific to the cloud site 110. Similarly, the resource prediction model 128 of the cloud site 120 may be trained using the dataset 126, which includes information specific to the cloud site 120.

Figure 2:
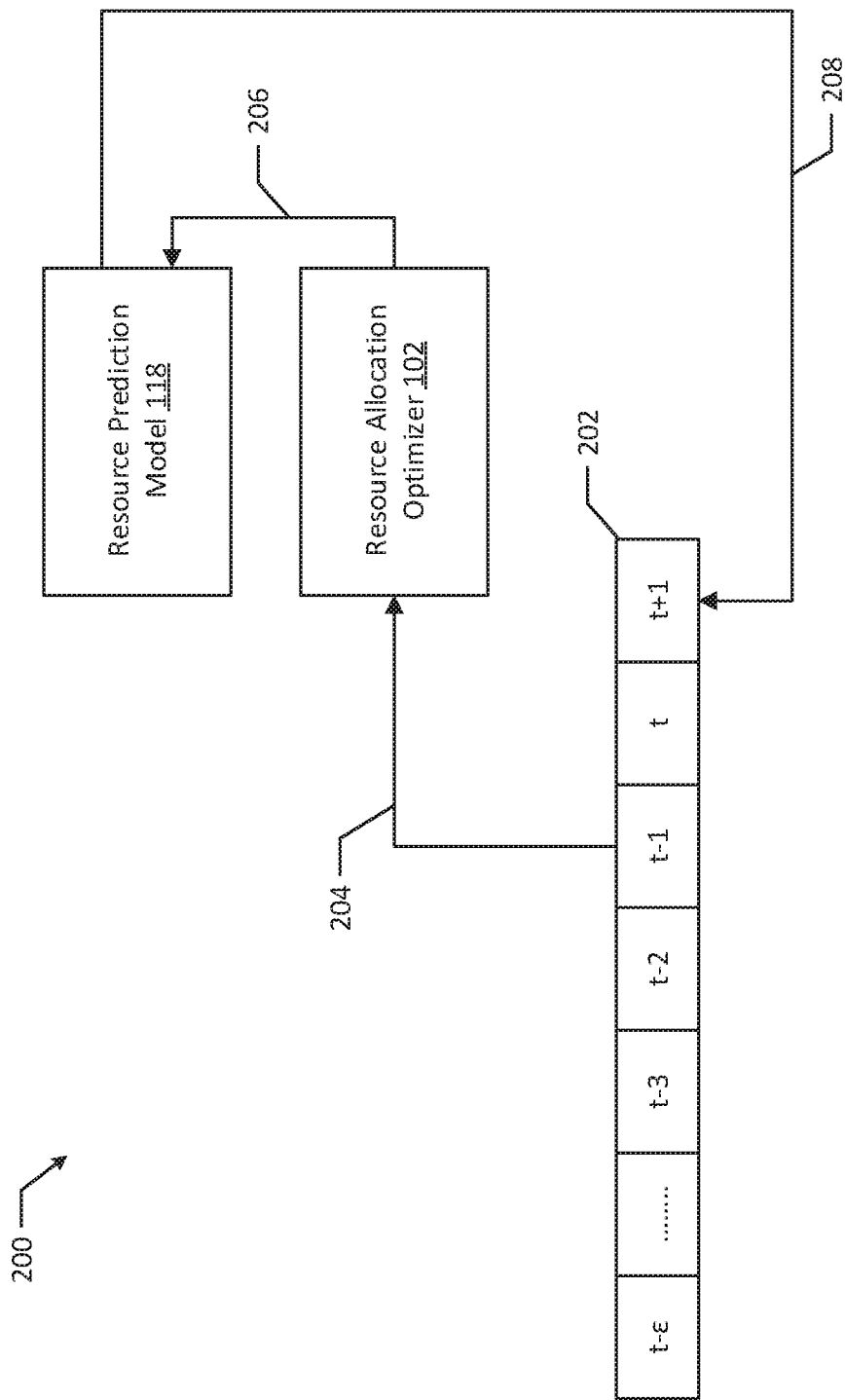
FIG. 2 illustrates a flow diagram of a method for predicting resources needed for a time step ahead in time series data, according to an aspect of the present disclosure.

FIG. 2 illustrates a flow diagram of a method 200 for predicting resources needed for a time step ahead in time series data 202. The time series data 202 in the method 200 may be structured into a supervised learning using the sliding window technique, where a sequence of previous ε time steps will be used as an input to a resource prediction model 110 or 120 in order to predict resources for a time step ahead (e.g., t+1). At the beginning of period t, the resource allocation optimizer 102 may receive information (e.g., collected video information 108) on historical incoming videos from period t-1 to determine the needed computational resources at each cloud site 110, 120 for period t-1. The determinations from the resource allocation optimizer 102 may be transmitted to the distributed resource prediction models 118, 128 in each cloud site 110, 120 so that each respective resource prediction model 118, 128 may forecast and reserve the required cloud instances for a future period t+1.

In an example, at 204, the start of each period t, the resource allocation optimizer 102 may receive collected video information 108 from the period t-1 (e.g., received from different cloud sites 110 and 120 and stored in the memory 106). From the collected video information 108, the resource allocation optimizer 102 may determine a desired quantity of cloud instances with which to serve viewers for each of the respective cloud sites (e.g., the cloud sites 110 and 120). In some aspects, the resource allocation optimizer 102 may determine which cloud site 110 or 120 should be used to serve the viewers. For example, the resource allocation optimizer 102 may determine which cloud site 110, 120 is nearest to the viewers. In some aspects, at 206, the resource allocation optimizer 102 may transmit the determined desired quantity of cloud instances to each of the cloud sites to be sent to their respective resource prediction models. In the illustrated example, the resource allocation optimizer 102 may transmit the determined desired quantity of cloud instances to the cloud site 110 to be sent to the resource prediction model 118.

At 208, the resource prediction models at each cloud site predict a quantity of cloud instances needed to achieve a predetermined quality level for a video streaming at a time frame t+1. In the illustrated example, the resource prediction model 118 predicts a quantity of cloud instances needed to achieve a predetermined quality level for a video streaming at a time frame t+1 at the cloud site 110. Based on the predictions from the respective resource prediction models, a quantity of cloud instances are reserved.

Figure 3:
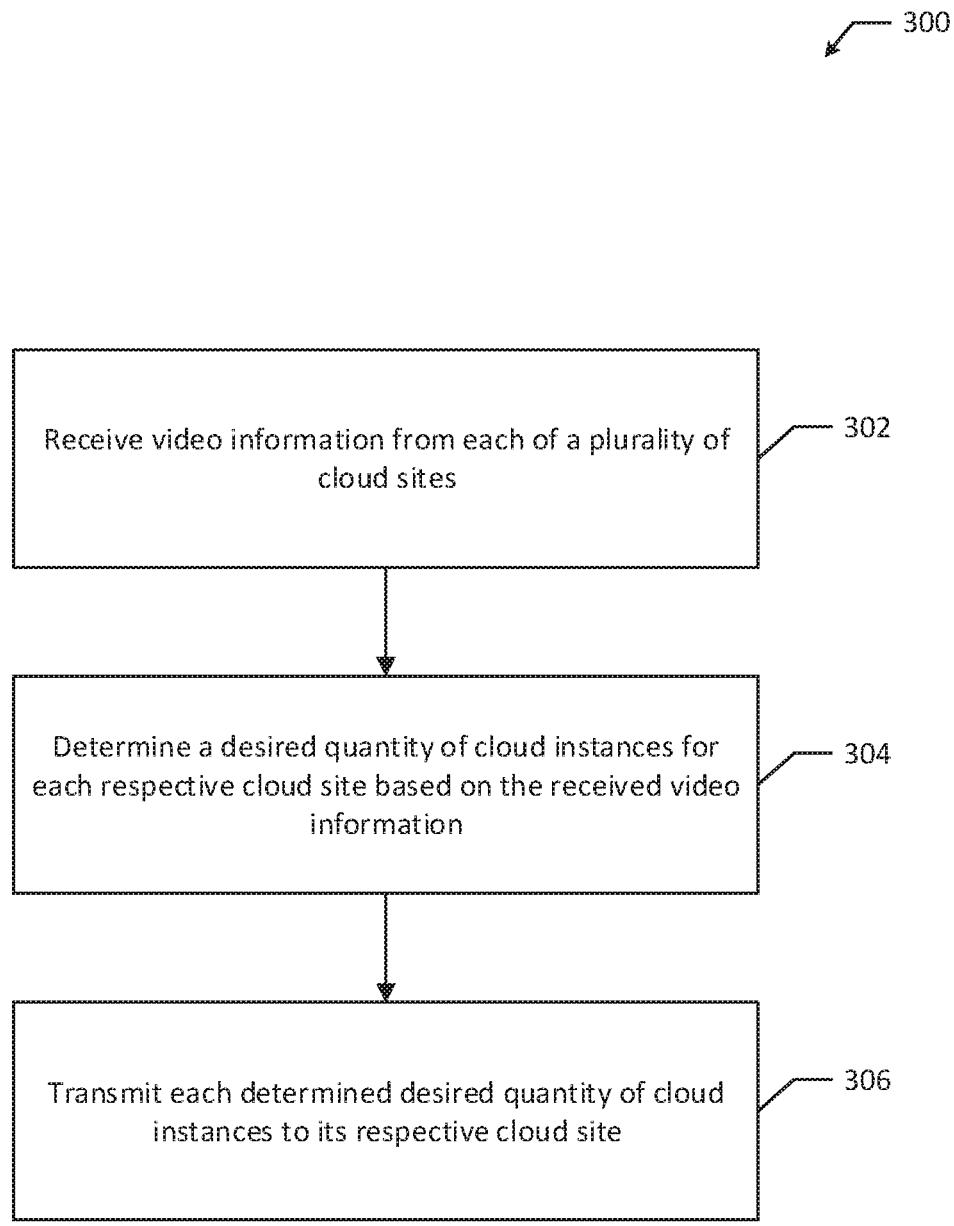
FIG. 3 illustrates a flow chart of a method for determining a desired quantity of cloud instances for streaming a video at a particular cloud site, according to an aspect of the present disclosure.

FIG. 3 shows a flow chart of an example method 300 for determining a desired quantity of cloud instances for streaming a video at a particular cloud site. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. For example, the processor of the resource allocation optimizer 102 may be configured to perform the method 300.

In at least some aspects, the method 300 includes receiving video information (e.g., collected video information 108) from each of a plurality of cloud sites (block 302). For example, the resource allocation optimizer 102 may receive video information from the cloud site 110 and video information from the cloud site 120, all of which composes the collected video information 108. In various aspects, the collected video information 108 may include any one or more of a length (e.g., minutes), size (e.g., gigabytes), bitrate (e.g., megabytes/sec), frame rate (e.g., frames/sec), resolution (e.g., 1080p), or similar information of one or more streamed live videos and geographical locations of the viewers of the streamed live videos.

Based on the received collected video information 108, a desired quantity of cloud instances for each respective cloud site may be determined (block 304). Determining the desired quantity of cloud instances may be based on minimizing a cost of broadcasting a respective video. In some aspects, determining the desired quantity of cloud instances is based on minimizing a cost of broadcasting a respective video while providing a predetermined bitrate of the video. For example, one or more viewers may request (e.g., choose a video quality) a particular bitrate for the streaming video. In at least some aspects, the cost of broadcasting a respective video (C) is a sum of a storage cost (S) at each respective cloud site, a migration cost (M) of a video replica from one respective cloud site to another respective cloud site, and a cost (G) of serving viewers, which is represented as Equation 1 below.

$$C = S + M + G \qquad \text{Equation 1.}$$

A set of incoming videos at a period t may be denoted by $V(t) = \{v_1, v_2, v_3, \ldots, v_m\}$ where each v is an incoming video. A set of regions may be represented by $R = \{r_1, r_2, r_3, \ldots, r_n\}$. For example, $r_b$, and $r_w$ may denote the broadcasting region, video allocation region, and video serving region, respectively. A round trip delay from $r_a$ to $r_w$ may be represented by $d_{r_a r_w}$. A set of predicted viewers for the incoming videos at period t may be represented by $P(t) = \{P_{v_1}, P_{v_2}, P_{v_3}, \ldots, P_{v_m}\}$. As each video has predicted viewers in different regions, $P_v = \{p_1, p_2, p_3, \ldots, p_n\}$ may denote the set of the number of predicted viewers at different regions for each video v. The broadcasters' regions for the incoming videos at period t may be denoted by $B(t) = \{r_1^b, r_2^b, r_3^b \ldots r_m^b\}$. Because some videos do not have any viewers near some cloud sites, $E(v, r_w)$ may represent a binary variable equal to one (1), if video v has predicted viewers near the region $r_w$, and may be equal to zero (0) otherwise. A decision variable $A(v, r_a)$ may be equal to one (1), if video v is allocated in region $r_a$, and may be equal to zero (0) otherwise. A decision variable $W(v, r_a, r_w)$ may be equal to one (1) if viewers at region $r_w$ are served from region $r_a$, and may be equal to zero (0) otherwise. In at least some aspects, it can be assumed that the storage capacity can be provisioned based on the application demand.

The storage cost (S) at each respective cloud site can be calculated according to Equation 2 below. In Equation 2, $\propto_{r_a}$ is a storage cost per gigabyte on an allocation cloud site at region $r_a$, which can vary based on cloud site location and the storage thresholds fixed by the cloud service provider. For example, a cloud service provider may charge $0.023 per GB for the first 50 TB or $0.021 per GB when exceeding 50 TB for its North Carolina cloud site in the United States. Additionally, in Equation 2, K is a video size (e.g., GB)

$$S = \Sigma_{v \in V(t)} \Sigma_{r_a \in R} \propto_{r_a} * K * A(v, r_a) \qquad \text{Equation 2.}$$

The migration cost (M) can be calculated according to Equation 3 below. In Equation 3, $\omega_{r_b}$ is the cost to migrate a copy of a video from the broadcaster region $r_b$ to allocation region $r_a$. This cost to migrate the copy is a data transfer cost from one cloud site to another cloud site per GB.

$$M = \Sigma_{v \in V(t)} \Sigma_{r_a \in R} \eta_{r_a} * K * A(v, r_a)$$  Equation 3.

The cost (G) of serving viewers can be calculated according to Equation 4 below. In Equation 4, $\omega_{r_a}$ is the serving request cost from region $r_a$, which is the data transfer cost from the region $r_a$ to the internet per GB.

$$G = \Sigma_{v \in V(t)} \Sigma_{r_a \in R} \Sigma_{r_w \in R} \omega_{r_a} * K * p_{r_w} * W(v, r_a, r_w)$$  Equation 4.

As mentioned above, determining the desired quantity of cloud instances may be based on minimizing the cost of broadcasting a respective video. Minimizing the total cost (C) for a period t may be calculated according to Equation 5 below subject to at least some of the constraints of Equations 6 to 11.

$$mi_{(v, r_a) W(v, r_a, r_w)} C$$  Equation 5.

In at least aspects, every video v is allocated in the broadcaster's nearest cloud site according to Equation 6 below.

$$A(v, r_b) = 1 \forall v \in V(t), \forall r_b \in B(t)$$  Equation 6.

In at least some aspects, a video v can be served from region $r_a$ to viewers at region $r_w$ only if it is allocated at region $r_a$ according to Equation 7 below.

$$(v, r_a, r_w) \leq A(v, r^a) \forall v \in V(t), \forall r_a \in R, \forall r_w \in R$$  Equation 7.

In at least some aspects, a video v can be served from region $r_a$ to region $r_w$ only if there exists viewers at region $r_w$ according to Equation 8 below.

$$W(v, r_a, r_w) \leq E(v, r_w) \forall v \in V(t), \forall r_w \in R, \forall r_w \in R$$  Equation 8.

In at least some aspects, if there exists viewers for video v at region $r_w$, they can only be served from one region according to Equation 9 below.

$$\Sigma_{\in R} W(v, r_a, r_w) = E(v, r_w) \forall v \in V(t), \forall r_w \in R$$  Equation 9.

In at least some aspects, an average serving request delay to serve a video v does not exceed a predetermined threshold D according to Equation 10 below.

$$\frac{\Sigma_{r_a \in R} \Sigma_{r_w \in R} p_{r_w} * d_{r_a r_w} * W(v, r_a, r_w)}{\Sigma_{r_w \in R} p_{r_w}} \leq D \; \forall \; v \in V(t).$$  Equation 10

As described above, $A(v, r_a)$ and $W(v, r_a, r_w)$ are each binary decision variables that be set to zero (0) or one (1) according to Equation 11 below.

$$A(v, r_a), W(v, r_a, r_w) \in \{0, 1\}$$  Equation 11.

Once the desired quantity of cloud instances for each respective cloud site are determined, each determined desired quantity of cloud instances may be transmitted to its respective cloud site (block 306). For example, the resource allocation optimizer 102 may transmit a determined desired quantity of cloud instances for the cloud site 110 to the cloud site 110 and a determined desired quantity of cloud instances for the cloud site 120 to the cloud site 120.

In some aspects, a particular cloud site from which viewers should be served is determined. For example, the resource allocation optimizer 102 may determine a cloud site that is nearest geographically to viewers, or likely viewers, of a video to be live streamed.

Figure 4:
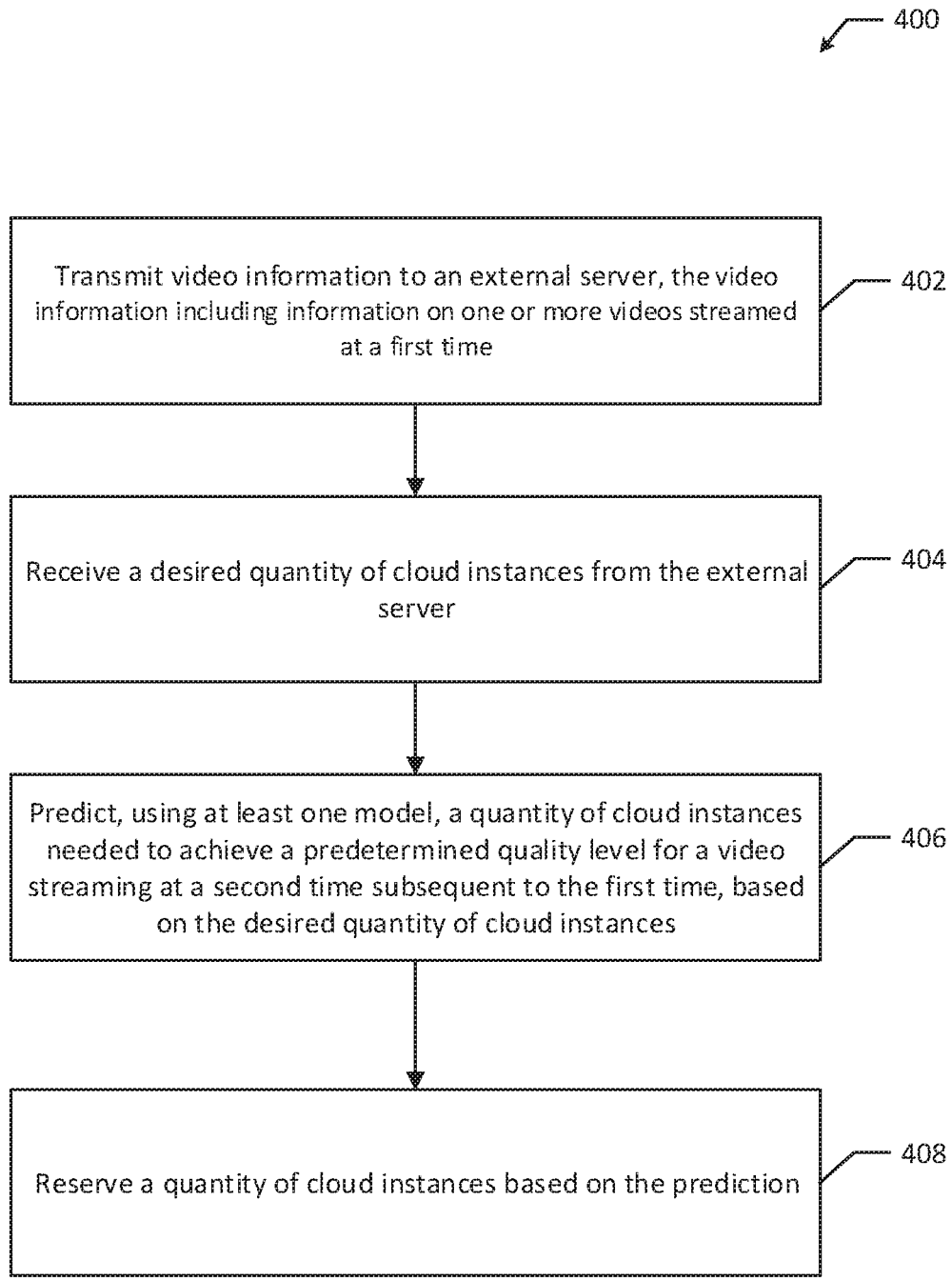
FIG. 4 illustrates a flow chart of a method for reserving a predicted quantity of cloud instances for a video to be live streamed, according to an aspect of the present disclosure.

FIG. 4 shows a flow chart of an example method 400 for reserving a predicted quantity of cloud instances for a video to be live streamed. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. For example, the processor of the cloud site 110 or the processor of the cloud site 120 may be configured to perform the method 400.

In at least some aspects, the method 400 includes transmitting video information to an external server (block 402). The video information may include information on one or more video streamed at a first time. For example, the cloud site 110 may transmit video information related to videos streamed at the cloud site 110 to the resource allocation optimizer 102. In response, the cloud site 110 may receive a desired quantity of cloud instances from the resource allocation optimizer 102 (block 404).

Based on the desired quantity of cloud instances, the cloud site 110 may predict a quantity of cloud instances needed to achieve a predetermined quality level (e.g., bitrate or resolution) for a video streaming at a second time subsequent to the first time using the resource prediction model 118 (block 406). For example, the resource allocation optimizer 102 may make a series of determinations of what a desired or optimal quantity of cloud instances is for a set of videos that have already been broadcast at the cloud site 110. This determination data may be stored in the dataset 116 and the resource prediction model 118 may be trained based on this determination data. The training helps the resource prediction model 118 to predict a quantity of cloud instances needed to live stream a particular video at the cloud site 110 in the future (e.g., a second time subsequent to the first time). In at least some aspects, the cloud site 110 may reserve a quantity of cloud instances based on the prediction from the resource prediction model 118 (block 408). For example, the cloud site 110 may reserve a quantity equal to the prediction.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:
1. A system comprising:
   a resource allocation optimizer including a first processor in communication with a first memory; and
   a plurality of cloud sites in communication with the resource allocation optimizer, each cloud site including a respective second processor in communication with a respective second memory, wherein the resource allocation optimizer is separate from the plurality of cloud sites, wherein the first processor is configured to:
receive video information from each of the plurality of cloud sites, wherein the video information includes past videos streamed at a first past time,
determine a desired quantity of cloud instances during a past interval for each respective cloud site based on the received video information, and
transmit each determined desired quantity of cloud instances to its respective cloud site, and
wherein each respective second processor is configured to:
predict, using at least one model, a quantity of cloud instances needed to achieve a predetermined quality level for videos to be streamed at a second future time subsequent to the first past time, based on the determined desired quantity of cloud instances during the past interval for the respective cloud site, and
reserve a quantity of cloud instances at the respective cloud site based on the prediction in advance of live-streaming of the videos,
wherein determining the desired quantity of cloud instances is based on minimizing a cost of broadcasting a video,
wherein the cost is a sum of a storage cost at each respective cloud site, a migration cost of a video replica from one respective cloud site to another respective cloud site, and a cost of serving viewers,
wherein the storage cost is calculated according to:

$$S = \Sigma_{v \in V(t)} \Sigma_{r_a \in R} \propto_{r_a} * K * A(v, r_a)$$

wherein
S is the storage cost,
v is an incoming video,
V(t) is a set of incoming videos at a period t,
$r_a$ is a video allocation region,
R is a set of regions,
$\propto_{r_a}$ is a storage cost per gigabyte,
K is a video size, and
$A(v, r_a)$ is a decision variable.

2. The system of claim 1, wherein the plurality of cloud sites are included in a geo-distributed cloud infrastructure.

3. The system of claim 1, wherein the video information includes information on a plurality of videos broadcasted at the plurality of cloud sites.

4. The system of claim 1, wherein the video information includes location information of the viewers of a video and a broadcasted video quality of the video.

5. The system of claim 1, wherein each respective cloud site includes its own respective collected video information.

6. The system of claim 1, wherein the at least one model is trained by one or more machine learning algorithms including Long Short Term Memory (LSTM), Gated Recurrent Unit (GRU), Convolutional Neural Network (CNN), MultiLayer Perceptron (MLP), and XGboost.

7. A method comprising:
receiving, by a resource allocation optimizer, video information from each of a plurality of cloud sites, wherein the video information includes information on a plurality of past videos broadcasted at the plurality of cloud sites at a first past time;
determining, by the resource allocation optimizer, a desired quantity of cloud instances during a past interval for each respective cloud site based on the received video information; and
transmitting, by the resource allocation optimizer, each determined desired quantity of cloud instances to its respective cloud site, wherein each cloud site includes a respective second processor configured to reserve a quantity of cloud instances at the respective cloud site based on a prediction in advance of live-streaming of videos, wherein the resource allocation optimizer is separate from the plurality of cloud sites,
wherein determining the desired quantity of cloud instances is based on minimizing a cost of broadcasting a video,
wherein the cost is a sum of a storage cost at each respective cloud site, a migration cost of a video replica from one respective cloud site to another respective cloud site, and a cost of serving viewers,
wherein the storage cost is calculated according to:

$$S = \Sigma_{v \in V(t)} \Sigma_{r_a \in R} \propto_{r_a} * K * A(v, r_a)$$

wherein
S is the storage cost,
v is an incoming video,
V(t) is a set of incoming videos at a period t,
$r_a$ is a video allocation region,
R is a set of regions,
$\propto_{r_a}$ is a storage cost per gigabyte,
K is a video size, and
$A(v, r_a)$ is a decision variable.

8. The method of claim 7, wherein the decision variable $A(v, r_a)$ is equal to one if the incoming video v is allocated in the video allocation region $r_a$ and is equal to zero otherwise.

9. The method of claim 7, wherein the migration cost is calculated according to:

$$M = \Sigma_{v \in V(t)} \Sigma_{r_a \in R} \eta_{r_a} * K * A(v, r_a)$$

wherein
M is the migration cost,
v is an incoming video,
V(t) is a set of incoming videos at a period t,
$r_a$ is a video allocation region,
R is a set of regions,
$\eta_{r_a}$ is a cost to migrate a copy of a video from a broadcaster region $r_b$ to the video allocation region $r_a$,
K is a video size, and
$A(v, r_a)$ is a decision variable.

10. The method of claim 7, wherein the cost of serving viewers is calculated according to:

$$G = \Sigma_{v \in V(t)} \Sigma_{r_a \in R} \Sigma_{r_w \in R} \omega_{r_a} * K * p_{r_w} * W(v, r_a, r_w)$$

wherein
G is the cost of serving viewers,
v is an incoming video,
V(t) is a set of incoming videos at a period t,
$r_a$ is a video allocation region,
R is a set of regions,
$r_w$ is a video serving region,
$\omega_{r_a}$ is a serving request cost from the video allocation region $r_a$,
K is a video size,
$p_{r_w}$ is a quantity of predicted viewers in the video serving region $r_w$, and
$W(v, r_a, r_w)$ is a decision variable.

11. The method of claim 10, wherein the decision variable $W(v, r_a, r_w)$ is equal to one if viewers in the video serving region $r_w$ are served from region $r_a$ and is equal to zero otherwise.

12. The method of claim 7, further comprising determining from which respective cloud site of the plurality of cloud sites that a video should be broadcast to one or more viewers.

13. The method of claim 12, wherein the respective cloud site from which the video should be broadcast is the cloud site that is nearest geographically to the one or more viewers.

14. A method comprising:
transmitting, by a resource allocation optimizer, video information to a plurality of cloud sites, wherein the video information includes information on one or more past videos streamed at a first past time;
receiving, by the plurality of cloud sites, a desired quantity of cloud instances during a past interval from the resource allocation optimizer, the desired quantity of cloud instances determined, by the resource allocation optimizer, based on the video information;
predicting, by the plurality of cloud sites, using at least one model, a quantity of cloud instances needed to achieve a predetermined quality level for a video to be streamed at a second future time subsequent to the first past time, based on the determined desired quantity of cloud instances during the past interval; and
reserving, by the plurality of cloud sites, a quantity of cloud instances based on the prediction in advance of live-streaming of the video, wherein the resource allocation optimizer is separate from the plurality of cloud sites,
wherein the desired quantity of cloud instances is determined based on minimizing a cost of broadcasting a video,
wherein the cost is a sum of a storage cost at each respective cloud site, a migration cost of a video replica from one respective cloud site to another respective cloud site, and a cost of serving viewers,
wherein the storage cost is calculated according to:

$$S = \Sigma_{v \in V(t)} \Sigma_{r_a \in R} \alpha_{r_a} * K * A(v, r_a)$$

wherein
S is the storage cost,
v is an incoming video,
V(t) is a set of incoming videos at a period t,
$r_a$ is a video allocation region,
R is a set of regions,
$\alpha_{r_a}$ is a storage cost per gigabyte,
K is a video size, and
$A(v, r_a)$ is a decision variable.

15. The method of claim 14, further comprising training the at least one model using the received desired quantity of cloud instances.

16. The method of claim 14, further comprising updating the video information with the received desired quantity of cloud instances.

17. The method of claim 14, wherein the video information includes one or more of a length, size, bitrate, frame rate, resolution, and one or more geographical locations of viewers of the one or more videos streamed at a first time.

* * * * *